United States Patent
Antony et al.

(10) Patent No.: US 9,304,878 B2
(45) Date of Patent: Apr. 5, 2016

(54) PROVIDING MULTIPLE IO PATHS IN A VIRTUALIZED ENVIRONMENT TO SUPPORT FOR HIGH AVAILABILITY OF VIRTUAL MACHINES

(71) Applicant: VMware, Inc., Palo Alto, CA (US)

(72) Inventors: Jinto Antony, Bangalore (IN); Sudhish Panamthanath Thankappan, Bangalore (IN); Jidhin Malathusseril Thomas, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 334 days.

(21) Appl. No.: 13/649,884

(22) Filed: Oct. 11, 2012

(65) Prior Publication Data

US 2014/0108854 A1    Apr. 17, 2014

(51) Int. Cl.
*G06F 11/00*     (2006.01)
*G06F 11/20*     (2006.01)

(52) U.S. Cl.
CPC .......... *G06F 11/2046* (2013.01); *G06F 11/203* (2013.01); *G06F 11/2035* (2013.01); *G06F 2201/815* (2013.01)

(58) Field of Classification Search
USPC .................................................. 714/4.2, 4.11
See application file for complete search history.

(56) References Cited

U.S. PATENT DOCUMENTS

2011/0321041 A1*   12/2011   Bhat et al. .......... 718/1
2013/0036323 A1*    2/2013   Goose et al. ......... 714/4.11

* cited by examiner

*Primary Examiner* — Sarai Butler
(74) *Attorney, Agent, or Firm* — Patterson & Sheridan, LLP (57) ABSTRACT

High availability of a virtual machine is ensured even when all of the virtual machine's IO paths fail. In such a case, the virtual machine is migrated to a host that is sharing the same storage system as the current host in which the virtual machine is being executed and has at least one functioning IO path to the shared storage system. After execution control of the virtual machine is transferred to the new host, IO operations from the virtual machine are issued over the new IO path.

20 Claims, 5 Drawing Sheets

PROVIDING MULTIPLE IO PATHS IN A VIRTUALIZED ENVIRONMENT TO SUPPORT FOR HIGH AVAILABILITY OF VIRTUAL MACHINES

BACKGROUND

High availability (HA) solutions are implemented in virtualized computing environments to minimize unplanned downtime and service disruption of virtual machines without dedicated standby hardware and installation of additional software. As part of such HA solutions, redundant input/output (IO) paths to a connected storage system are provided for the virtual machines. When an IO path between a virtual machine and the storage system fails, another IO path will become active and the IO between the virtual machines and the storage system will continue without any interruption. If all IO paths between the virtual machine and the storage system should fail, however, alternative solutions will need to be implemented to prevent downtime and service disruption of the virtual machine.

SUMMARY

One or more embodiments disclosed herein provide high availability of a virtual machine even when all of the virtual machine's IO paths fail. According to the embodiments, the virtual machine is migrated to a host that is sharing the same storage system as the host in which the virtual machine is currently being executed and has at least one functioning IO path to the shared storage system. After execution control of the virtual machine is transferred to the new host, IO operations from the virtual machine are issued over the new IO path.

A method of providing high availability according to an embodiment includes the steps of detecting a failure in an IO path from a virtual machine being executed in a first host computer to a shared storage system, initiating a migration process of the virtual machine to a second host computer that is connected to the shared storage system along a different IO path, and terminating execution control of the virtual machine in the first host computer after the second host computer takes over execution of the virtual machine. In this method, the second host computer has at least one functioning IO path to the shared storage system so that, after the migration, the virtual machine can connect to the shared storage system via this IO path. Further, during this method, IO operations issued by the virtual machine are directed to an IO cache for later execution in the second host computer.

A virtualized computing system according to an embodiment includes a plurality of host computers, including a first host computer having one or more virtual machines being executed therein and a second host computer, a shared storage system that stores virtual disks of the virtual machines, and a virtual machine management server that is programmed to: (i) notice a failure in an IO path from a virtual machine being executed in the first host computer to the shared storage system, (ii) initiate a migration process of the virtual machine from the first host computer to a second host computer that is connected to the shared storage system along a different IO path, and (iii) terminate the migration process and transfer execution control of the virtual machine from the first host computer to the second host computer, as a result of which the different IO path is established as a new IO path from the virtual machine to the shared storage system.

Further embodiments include, without limitation, a non-transitory computer-readable storage medium that includes instructions that enable a processing unit to implement one or more aspects of the above method and system.

DETAILED DESCRIPTION

Figure 1:
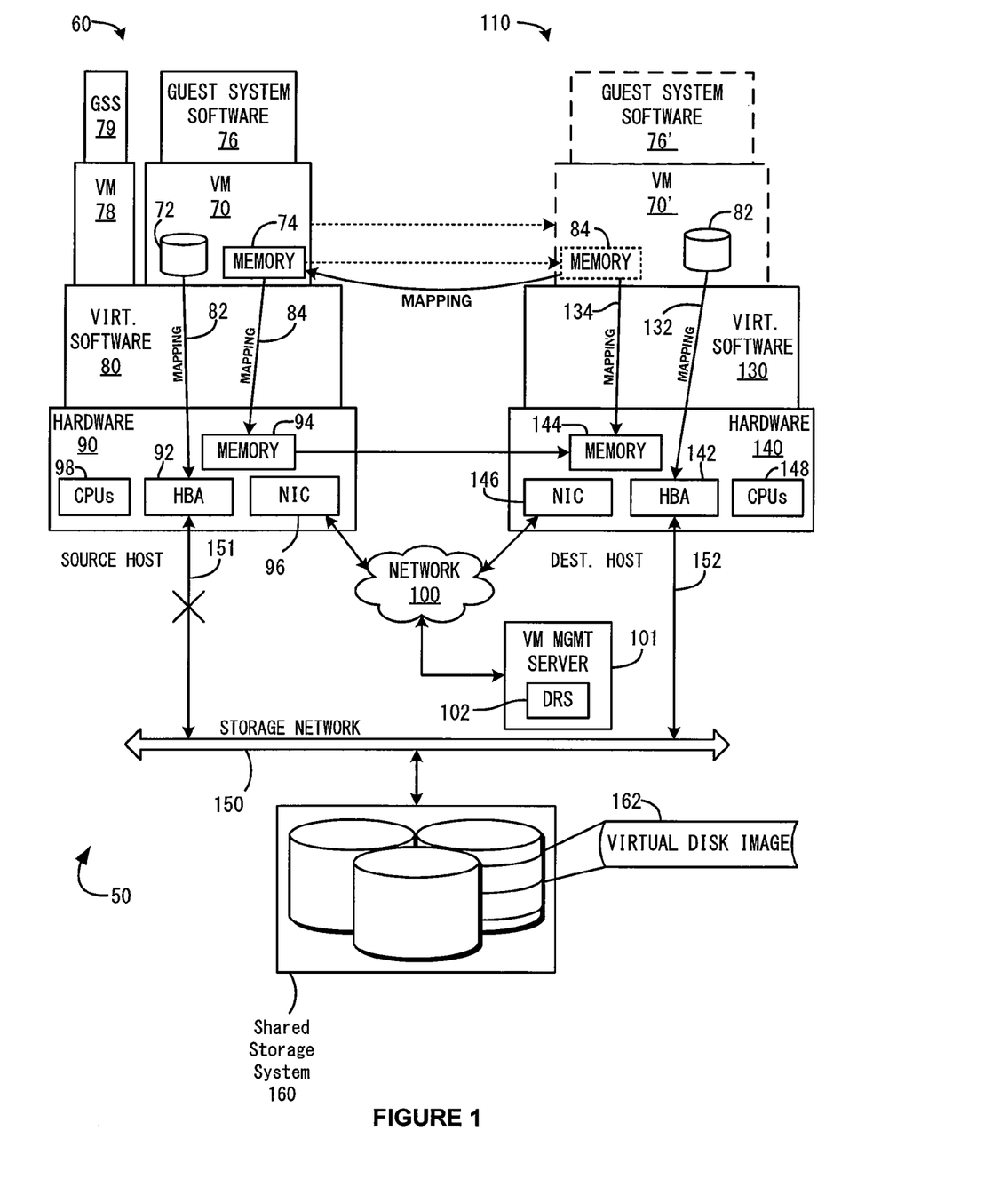
FIG. 1 is a block diagram of a virtualized computing environment in which a method according an embodiment may be implemented.

According to one or more embodiments disclosed herein, high availability of a virtual machine (VM) is ensured even when all of the virtual machine's IO paths fail by migrating the VM to a host computer (hereinafter referred to as "host") that is sharing the same storage system as the host in which the VM is currently being executed and has at least one functioning IO path to the shared storage system. FIG. 1 is a block diagram of a virtualized computing environment in which virtual machine migration is carried out from a source host to a destination host and new IO path for the VM is established in the destination host.

Exemplary implementations of migration of VMs while the VMs are executing (sometime referred to as "live migration") are described in detail in U.S. Pat. No. 7,484,208 which issued on Jan. 27, 2009, and U.S. Pat. No. 7,680,919, which issued on Mar. 16, 2010. These two patents are expressly herein incorporated by reference in their entirety. In general terms, one important aspect of performing live migration is copying the state of the VM from the source host to the destination host in a manner that allows minimal or insignificant disruption of the VM's execution at the time of the transfer from the source host to the destination host. A challenging component of this state information to be transferred is the guest physical memory. A VM's guest physical memory comprises those pages of machine memory (i.e., actual physical memory residing in the host) that are mapped or allocated to the VM being migrated. The guest physical memory address space is treated by the guest system software (e.g., the guest operating system) as actual physical memory, but the guest physical memory address space is mapped by the virtualization software to physical pages of machine memory. The main reason it is challenging to transfer the guest physical memory to the destination host during live migration is that the VM is allowed to continue to execute during the transfer, and thus the VM continues to update the guest physical memory as the guest physical memory is being copied to the destination host.

To copy guest physical memory to a destination host while the VM is executing, an iterative pre-copy scheme may be used, as described in detail in the patents incorporated by reference above. In general, the guest physical memory pages are iteratively copied to the destination host prior to execution of the migrating VM on the destination host. Such iterative copying involves multiple copying operations beginning with copying the entire contents of the guest physical memory from the source host to the destination host, then repeatedly copying the pages dirtied (i.e., written to or modified by the VM) since the previous copy operation. Provided the bandwidth for transmitting the copied pages between the source and destination hosts is high enough, the pre-copy process will eventually converge to a sufficiently small set of guest physical memory pages that can then be successfully copied to the destination host after stunning the VM on the source host, so that the VM can then be resumed on the destination host with minimal or insignificant interruption.

Referring to FIG. 1, a source host 60 includes a hardware platform 90 on which virtualization software 80 executes. Virtualization software 80 comprises system software (not shown) that manages and allocates hardware resources such as central processing units (CPUs) 98, machine memory 94, host bus adapter (HBA) 92 and network interface controller (NIC) 96. In addition, virtualization software 80 includes a virtual machine monitor (VMM) component (not shown) that is responsible for emulating system components to support execution of VM 70. Although only two VMs are shown executing on virtualization software 80, it should be recognized that any number of VMs may execute concurrently (i.e., either time-wise interleaved on a single processor or simultaneously on a plurality of processors), the number of VMs being limited only by the sufficiency of hardware resources to support reasonable VM execution.

Virtualization software 80 is responsible for mapping virtual hardware resources associated with VM 70 to physical hardware resources so that each virtual hardware resources is backed up by some physical resource. For example, guest physical memory 74, which is memory treated by guest system software 76 as physical memory, is mapped to machine memory 94 by memory mapping 84. Memory mapping 84 may be implemented, for example, using a guest physical to machine memory page table, which is maintained by virtualization software 80. Guest system software 76 is software executing on VM 70, including a guest operating system and guest applications. The guest operating system may be a commodity operating system such as Microsoft Windows®, OS/X®, Linux®, or some other guest system software designed to execute on virtual CPU(s) (not shown) exported by virtualization software 80. Virtual disk 72 may be mapped to a virtual disk image file 162 that is maintained on datastore 160 by virtualization software 80 according to disk mapping 82 and accessible through HBA 92.

Destination host 110 includes a hardware platform 140 having physical hardware including an HBA 142, machine memory 144, a NIC 146, and CPUs 148. In addition, destination host 110 includes virtualization software 130 executing on hardware platform 140. Virtualization software 80 executing on source host 60 is in communication via network 100 with virtualization software 130 executing on destination host 110.

In response to a command from a virtual machine management server 101 which is generated in response to a user input or an automated system (e.g., a resource scheduler such as VMware's Distributed Resource Scheduler, shown in FIG. 1 as DRS 102) to live-migrate VM 70 from source host 60 to destination host 110, virtualization software 80 and virtualization software 130 cooperate to begin copying guest physical memory 74 from the source host 60 to the destination host 110. Such a command may originate over network 100. In one embodiment, virtualization software 80 accesses guest physical page tables (illustrated by mapping 84) to identify machine pages in machine memory 94 to be copied to machine memory 144 in destination host 140. This copying may occur over network 100 while VM 70 continues to execute, and therefore issue writes and reads to guest physical memory 74.

In one embodiment, guest physical memory 74 is copied from source host 60 to destination host 110 in an iterative manner, wherein at each iteration, only those pages of guest physical memory 74 that have been written to since the last iteration are copied to destination host 110. Depending on the working set of pages of whatever guest system software that is running in VM 70 and the available bandwidth of the network connection from source host 60 to destination host 110, the iterative copying of guest physical memory 74 may or may not converge on a set of pages that is sufficiently small to enable spontaneous transfer of the execution of VM 70 to destination host 110. Such situations may arise when the rate of modifying the pages of guest physical memory 74 is too high and/or the available transmission rate of the network connection is relatively low. As a way to ensure convergence during migration of VM 70, the effective rate of executing instructions in VM 70 is slowed down so that the pages of guest physical memory 74 are modified at a lower rate. The effective rate of executing instructions in VM 70 may be slowed down by inserting one or more pauses into the instruction stream of VM 70.

Figure 2:
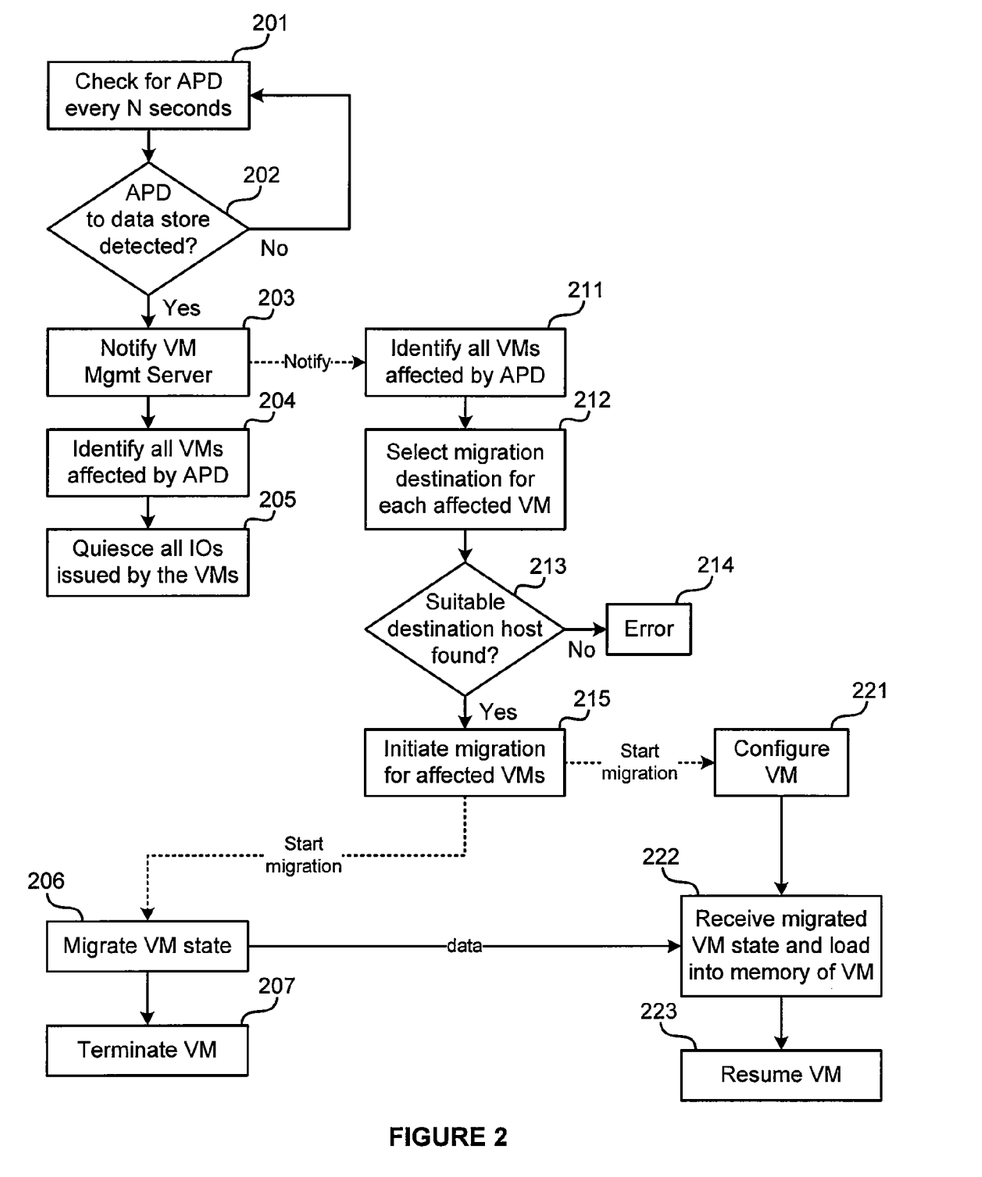
FIG. 2 is a flow diagram that illustrates the steps of a method for establishing a new IO path for a virtual machine.

FIG. 2 is a flow diagram that illustrates the steps of a method for establishing a new IO path for a virtual machine at destination host 110 when it has been determined that all IO paths are down at source host 60. In the embodiment illustrated herein, steps 201-207 are executed at source host 60, in particular by virtualization software 80, steps 211-214 at VM management server 101, and steps 221-223 at destination host 110, in particular by virtualization software 130.

Steps 201-202 represent a periodic check that virtualization software 80 carries out to check the condition of IO paths to shared storage system 160. If there are no functioning IO paths to shared storage system 160, a condition referred to as all paths down (APD), virtualization software 80 at step 203 notifies VM management server 101 of this condition. Then, at step 204, virtualization software 80 identifies all VMs running in source host 60 that are affected by the APD condition. At step 205, virtualization software 80 prepares the VMs identified at step 204 for migration by quiescing all IOs issued by the VMs. As a result, all write IOs are cached in a temporary buffer in system memory or any local storage separately for each VM, and all read IOs will be retried after migrating the VM to destination host 110.

At step 206, upon receiving a start migration command from VM management server 101, which includes an ID of destination host 110, virtualization software 80 performs live migration of the VM according to one of the methods described below in conjunction with FIGS. 3A, 3B, and 3C. Then, upon switching over execution control of the VM to destination host 110, e.g., at the conclusion of the methods described below in conjunction with FIGS. 3A, 3B, and 3C, the VM is terminated at source host 80 (step 207).

At step 211, upon receiving a notice from virtualization software 80 of source host 60 that all IO paths are down at source host 60, VM management server 101 identifies all VMs that are affected by this condition. At step 212, VM management server 101 selects a destination host from among a plurality of candidate destination host that has at least one functioning IO path to shared storage system 160. In one embodiment, the destination host is selected by DRS 102 of VM management server 101 according to various criteria including the number of functioning IO paths to shared storage system 160, loads on the IO paths, and physical resources available (e.g., current processor and memory usage). If VM management server 101 determines at step 213 that a suitable destination host cannot be found, e.g., there is no host with at least one functioning IO path to shared storage system 160 and sufficient physical resources to support the migration of one or more VMs running in source host 60, VM management server 101 returns an error to source host 60 at step 214. On the other hand, if one or more suitable destination host can be found (the selected destination host being depicted in FIG. 1 as destination host 110), VM management server 101 initiates migration of the affected VMs at step 215 by issuing a start migration command to the source host (e.g., virtualization software 80 of source host 60) and the destination hosts (e.g., virtualization software 130 of destination host 110).

Each virtualization software of the destination hosts (e.g., virtualization software 130 of destination host 110), upon receiving the start migration command from VM management server 101, configures a VM at step 221 in preparation for live migration of a VM's executing state from the source host. At step 222, the VM's executing state is copied into machine memory of the destination host that is mapped to physical memory of the VM configured at step 221. The VM's executing state that is copied includes the write IOs that were cached at the source host. Then, upon switching over execution control of the VM to destination host 110, e.g., at the conclusion of the methods described below in conjunction with FIGS. 3A, 3B, and 3C, the VM is resumed at destination host 110 with the IO path to shared storage system 160 from destination host 110 (e.g., IO path 152) established for the IOs from the VM to shared storage system 160 (step 223). Upon VM resumption in destination host 110, the write IOs cached in the temporary buffer are issued over IO path 152.

Figure 3A:
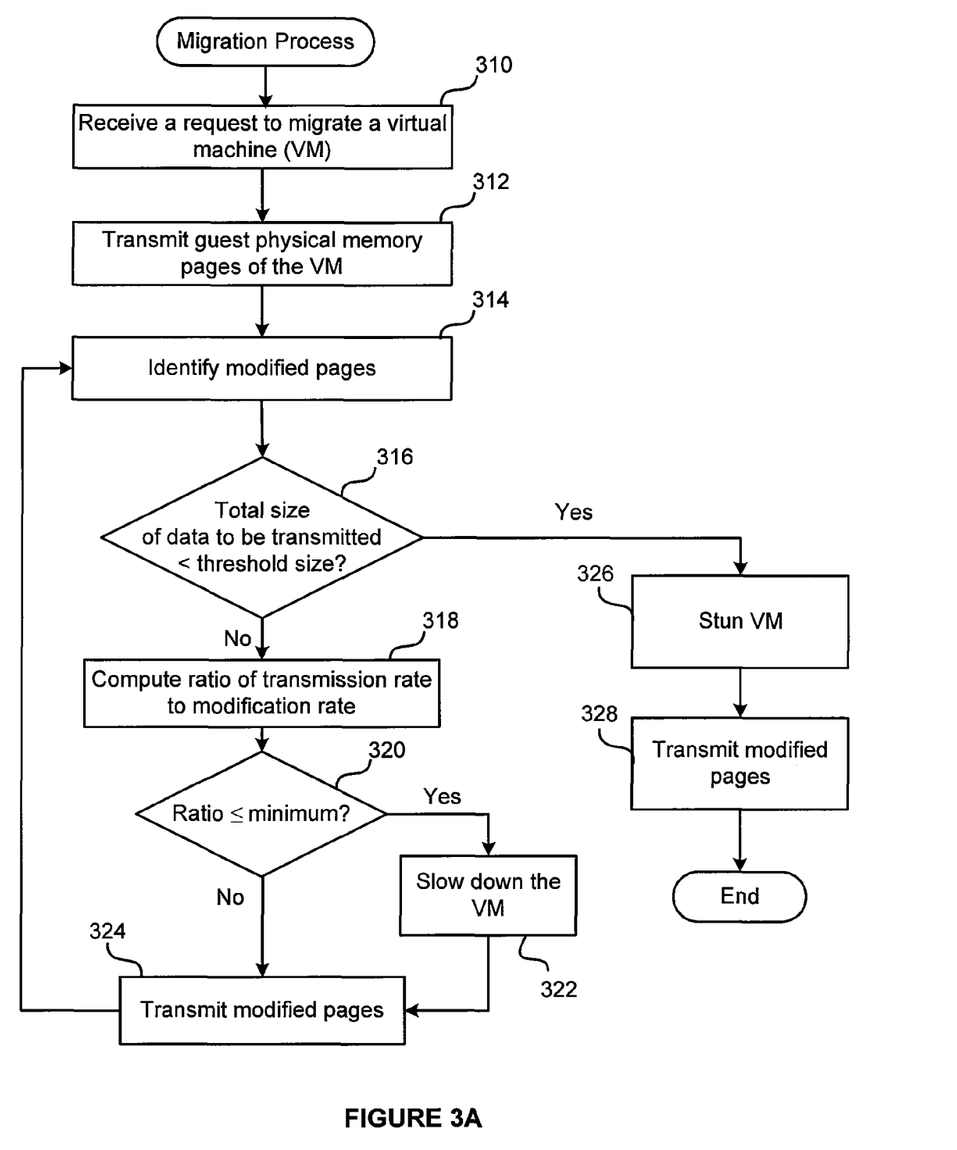
FIG. 3A is a flow diagram of a virtual machine migration process during which the effective rate of executing instructions in the virtual machine is reduced.

FIG. 3A is a flow diagram of a virtual machine migration process during which the effective rate of executing instructions in the virtual machine is reduced. The process begins at step 310 where a request to migrate a VM is received at the source host. At step 312, the source host begins transmitting contents of guest physical memory pages of the VM to the destination host. It should be recognized that, while step 312 is being carried out, the VM continues to run on the source host and, as a result, there may be guest physical memory pages of the VM that are modified (i.e., dirtied). At step 314, the modified guest physical memory pages are identified by virtualization software 80. In one embodiment, virtualization software 80 maintains a dirty bitmap covering the guest physical pages, such that each time a guest physical page is modified, a corresponding bit in this dirty bitmap is set and, when a dirty guest physical page is selected for transmission, its corresponding bit in this dirty bitmap is cleared. At step 316, virtualization software 80 compares the total size of the modified pages with a threshold size. If the total size is less than the threshold size, steps 326 and 328 are executed. The VM is stunned at the source host at step 326 and the modified pages are transmitted to the destination host at step 328. Upon completion of the modified page transmission at step 328, this process terminates at the source host and the VM is resumed at the destination host.

At step 316, if virtualization software 80 determines that the total size is not less than the threshold size, step 318 is executed, where virtualization software 80 computes the ratio of a transmission rate of the pages from the source host to the destination host to the modification rate of the guest memory pages of the VM (i.e., transmission rate/modification rate), where the transmission rate is determined from the number of pages transmitted from the source host to the destination host and the time taken for this transmission, and the modification rate is determined from the number of modified pages determined at step 314 and the time period during which the modifications took place. Then, at step 320, the ratio computed at step 318 is compared with a predefined minimum ratio (e.g., 5). If the computed ratio is less than or equal to the predefined minimum ratio, step 322 is executed, where virtualization software 80 slows down the execution rate of VM instructions. In one embodiment, the slowdown in the execution rate of VM instructions is achieved by inserting one or more pauses in the instruction stream of the VM. The number of pauses or the length of pauses may be selected to be proportional to the modification rate. It should be recognized that, as a result of the slowdown, the rate at which VM is dirtying the pages of the guest physical memory will be reduced. At step 324, which is executed when it is determined at step 320 that the computed ratio is not less than the predefined minimum ratio or after step 322, the modified guest physical memory pages are transmitted to the destination host. The process returns to step 314 after step 324 for another pre-copy iteration.

Figure 3B:
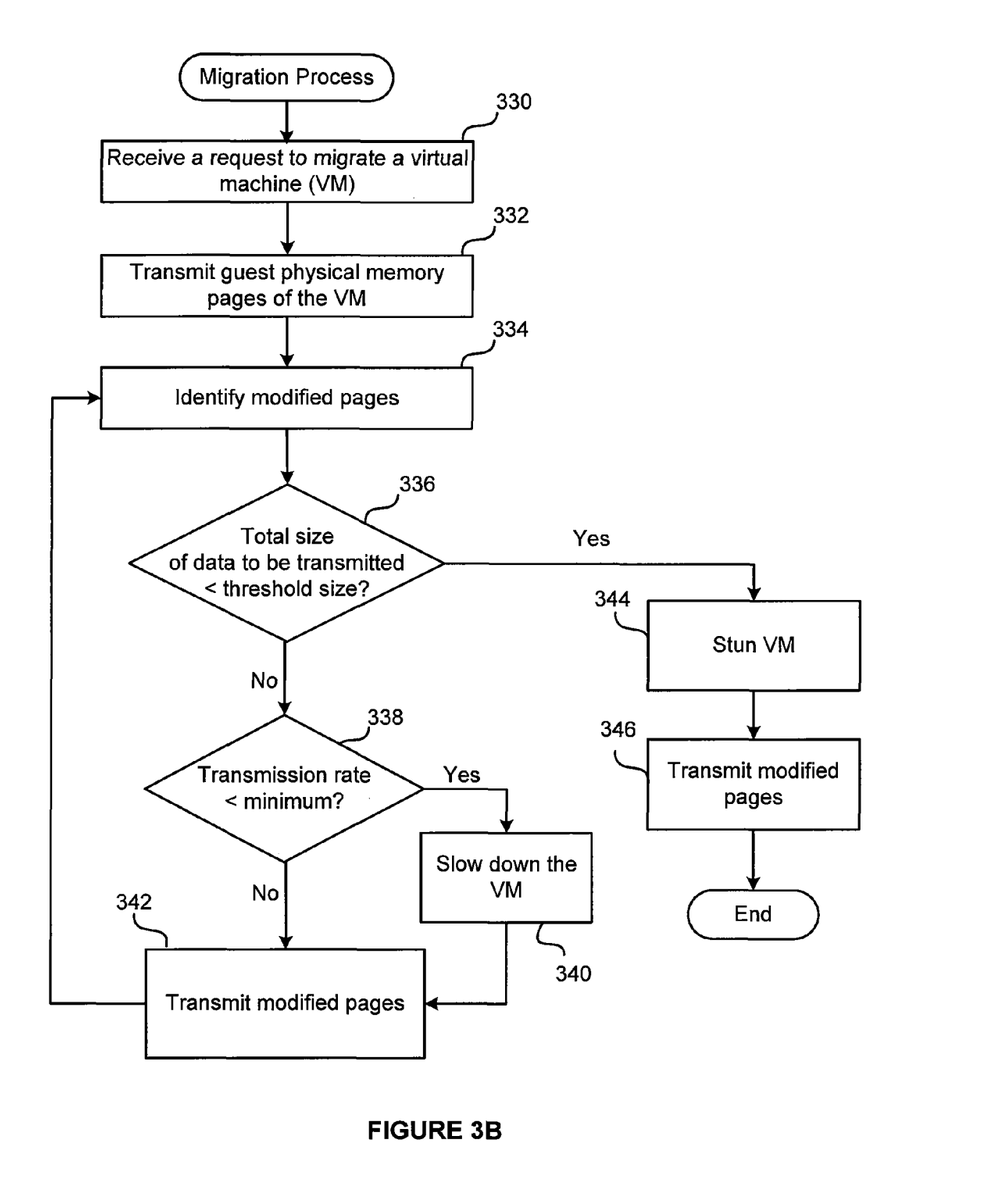
FIG. 3B is a flow diagram of a virtual machine migration process during which the effective rate of executing instructions in the virtual machine is reduced based on a network transmission rate.

FIG. 3B is a flow diagram of a VM migration process during which the effective rate of executing instructions in the VM is reduced based on a network transmission rate. In the embodiment illustrated herein, virtualization software 80 is carrying out the VM migration process to transmit all guest physical memory pages of the VM from a source host to a destination host over a network. The process begins at step 330 where a request to migrate a VM is received at the source host. At step 332, the source host begins transmitting contents of guest physical memory pages of the VM to the destination host. It should be recognized that, while step 332 is being carried out, the VM continues to run on the source host and, as a result, there may be guest physical memory pages of the VM that are modified (i.e., dirtied). At step 334, the modified guest physical memory pages are identified by virtualization software 80. In one embodiment, virtualization software 80 maintains a dirty bitmap covering the guest physical pages in the same manner described above. At step 336, virtualization software 80 compares the total size of the modified pages with a threshold size. If the total size is less than the threshold size, steps 344 and 346 are executed. The VM is stunned at the source host at step 344 and the modified pages are transmitted to the destination host at step 346. Upon completion of the modified page transmission at step 346, this process terminates at the source host and the VM is resumed at the destination host.

At step 336, if virtualization software 80 determines that the total size is not less than the threshold size, step 338 is executed, where virtualization software 80 compares a network transmission rate with a predefined minimum transmission rate, where the network transmission rate is determined from the number of pages transmitted from the source host to the destination host and the time taken for this transmission. If the network transmission rate is less than a predefined minimum transmission rate, step 340 is executed, where virtualization software 80 slows down the execution rate of the VM. In one embodiment, the slowdown in the execution rate of VM instructions is achieved by inserting one or more pauses in the instruction stream of the VM. The number of pauses or the length of pauses may be selected to be proportional to the difference between the network transmission rate and the predefined minimum transmission rate. It should be recognized that, as a result of the slowdown, the rate at which VM is dirtying the pages of the guest physical memory will be reduced. At step 342, which is executed when it is determined at step 338 that the network transmission rate is not less than the predefined minimum transmission rate or after step 340, the modified guest physical memory pages are transmitted to the destination host. The process returns to step 334 after step 342 for another pre-copy iteration.

Figure 3C:
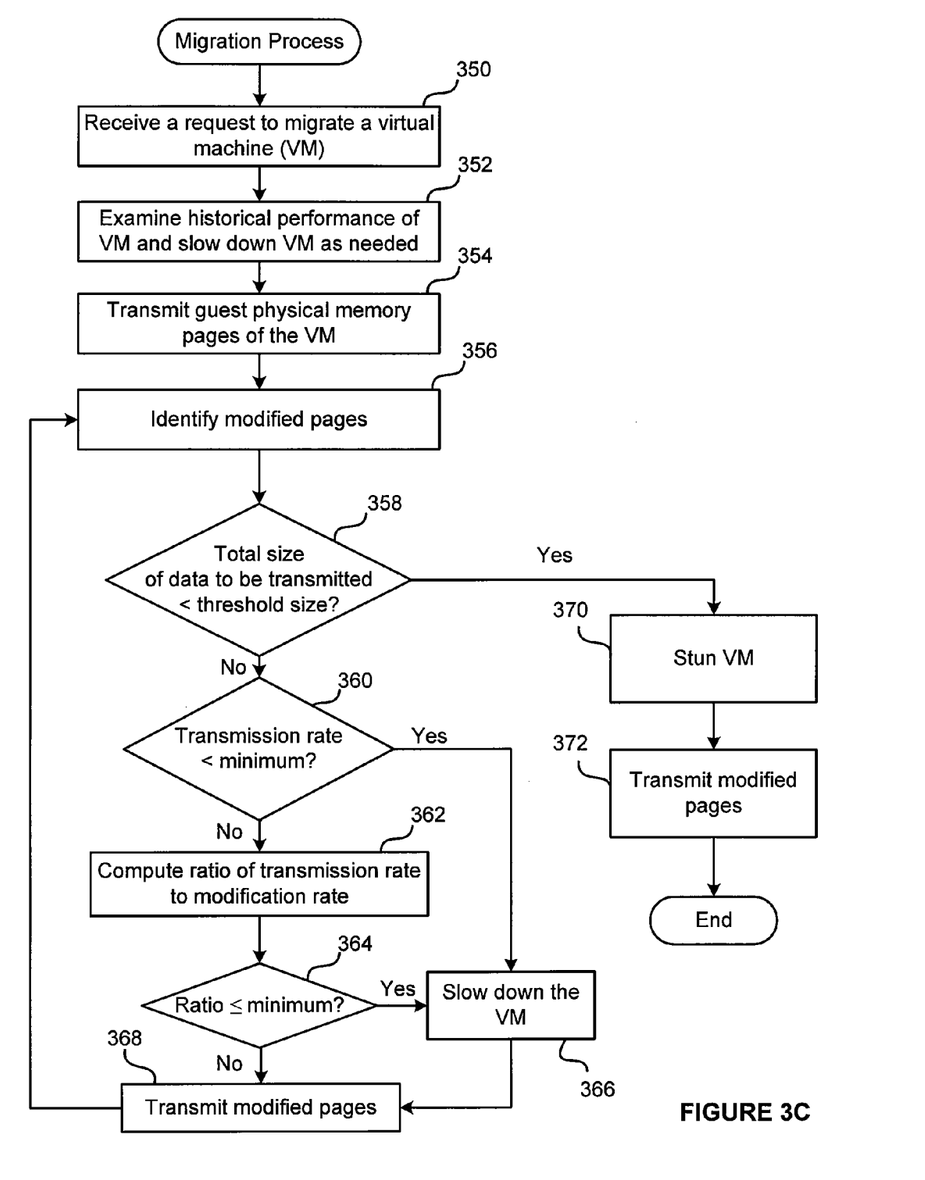
FIG. 3C is a flow diagram of a virtual machine migration process during which historical performance of the virtual machine is examined to reduce the effective rate of executing instructions.

FIG. 3C is a flow diagram of a virtual machine migration process during which historical performance of the virtual machine is examined to reduce the effective rate of executing instructions in the VM prior to any pre-copy iterations of the VM migration process. The process begins at step 350 where a request to migrate a VM is received at the source host. Then, at step 352, the VM's historical performance is examined. The historical performance of the VM may include any prior computations of the VM's modification rate, e.g., in connection with a prior VM migration. If the VM's modification rate is greater than some threshold value, virtualization software 80 slows down the execution rate of the VM. In one embodiment, the slowdown in the execution rate of VM instructions is achieved by inserting one or more pauses in the instruction stream of the VM. The number of pauses or the length of pauses may be selected to be proportional to the difference between the modification rate and the threshold value. At step 354, the source host begins transmitting contents of guest physical memory pages of the VM to the destination host. It should be recognized that, while step 354 is being carried out, the VM continues to run on the source host and, as a result, there may be guest physical memory pages of the VM that are modified (i.e., dirtied). At step 356, the modified guest physical memory pages are identified by virtualization software 80. In one embodiment, virtualization software 80 maintains a dirty bitmap covering the guest physical pages in the same manner described above. At step 358, virtualization software 80 compares the total size of the modified pages with a threshold size. If the total size is less than the threshold size, steps 370 and 372 are executed. The VM is stunned at the source host at step 370 and the modified pages are transmitted to the destination host at step 372. Upon completion of the modified page transmission at step 372, this process terminates at the source host and the VM is resumed at the destination host.

At step 358, if virtualization software 80 determines that the total size is not less than the threshold size, step 360 is executed, where virtualization software 80 compares a network transmission rate with a predefined minimum transmission rate, where the network transmission rate is determined from the number of pages transmitted from the source host to the destination host and the time taken for this transmission. If the network transmission rate is less than a predefined minimum transmission rate, step 366 is executed, where virtualization software 80 slows down the execution rate of the VM. In one embodiment, the slowdown in the execution rate of VM instructions is achieved by inserting one or more pauses in the instruction stream of the VM. The number of pauses or the length of pauses may be selected to be proportional to the difference between the network transmission rate and the predefined minimum transmission rate. At step 360, if virtualization software 80 determines that the network transmission rate is not less than a predefined minimum transmission rate, step 362 is executed, where virtualization software 80 computes the ratio of the network transmission rate to the modification rate of the guest memory pages of the VM (i.e., transmission rate/modification rate), where the modification rate is determined from the number of modified pages determined at step 356 and the time period during which the modifications took place. Then, at step 364, the ratio computed at step 362 is compared with a predefined minimum ratio (e.g., 5). If the computed ratio is less than or equal to the predefined minimum ratio, step 366 is executed, where virtualization software 80 slows down the execution rate of VM instructions. The number of pauses or the length of pauses may be selected to be proportional to the modification rate. It should be recognized that, as a result of the slowdown of the execution rate of VM instructions at step 366, the rate at which VM is dirtying the pages of the guest physical memory will be reduced. At step 368, which is executed when it is determined at step 364 that the computed ratio is not less than the predefined minimum ratio or after step 366, the modified guest physical memory pages are transmitted to the destination host. The process returns to step 356 after step 368 for another pre-copy iteration.

In some situations, it may be desirable for the execution of the VM to be transferred to the destination host before all of the pages of the guest physical memory of the VM are copied to the destination host. As the VM runs on the destination host and encounters pages that it lacks, but remain present on the source host, the VM demand faults those pages over the network from the source host. This process is called "resume during page-in" (RDPI) and enables the system to guarantee transparent migration success, even for VMs having large working sets of memory pages which have not been pre-copied.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. In a virtualized computing environment having multiple host computers in which one or more virtual machines are being executed and a shared storage system that stores virtual disks of the virtual machines, a method of connecting the virtual machines to the virtual disks of the virtual machines that are stored in the shared storage system over one of multiple input/output (IO) paths, comprising:
   detecting a failure in an IO path from a virtual machine being executed in a first host computer to the shared storage system;
   initiating a migration process of the virtual machine to a second host computer that is connected to the shared storage system along a different IO path that is functioning; and
   terminating execution control of the virtual machine in the first host computer when the second host computer takes over execution of the virtual machine.

2. The method of claim 1, further comprising:
   prior to said initiating, determining that the second host computer has at least one functioning IO path to the shared storage system,
   wherein the at least one functioning IO path includes the different IO path.

3. The method of claim 1, further comprising:
   prior to said initiating, determining that the second host computer has sufficient physical resources to accommodate the execution of the virtual machine therein.

4. The method of claim 1, wherein:
   during the migration process, an execution rate of instructions of the virtual machine in the first host computer is reduced.

5. The method of claim 1, wherein:
   during the migration process, IO operations issued by the virtual machine are directed to an IO cache for execution in the second host computer using the new IO path.

6. The method of claim 5, wherein the IO cache is maintained in memory of the first host computer and transferred to the second host computer during the migration process.

7. The method of claim 1, wherein said terminating is carried out before an entire state of the virtual machine is transferred from the first host computer to the second host computer.

8. The method of claim 7, further comprising:
   in response to a request from the second computer, transferring a portion of the entire state of the virtual machine to the second computer.

9. In a virtualized computing environment having multiple host computers in which one or more virtual machines are being executed and a shared storage system that stores virtual disks of the virtual machines, a method of connecting the virtual machines to the virtual disks of the virtual machines that are stored in the shared storage system over one of multiple input/output (IO) paths, comprising:
   receiving notice of a failure in an IO path from a virtual machine being executed in a first host computer to the shared storage system;
   initiating a migration process of the virtual machine from the first host computer to a second host computer that is connected to the shared storage system along a different IO path that is functioning; and
   terminating the migration process and transferring execution control of the virtual machine from the first host computer to the second host computer, as a result of which the different IO path is established as a new IO path from the virtual machine to the shared storage system.

10. The method of claim 9, further comprising:
    prior to said initiating, determining that the second host computer has at least one functioning IO path to the shared storage system,
    wherein the at least one functioning IO path includes the different IO path.

11. The method of claim 9, further comprising:
    prior to said initiating, determining that the second host computer has sufficient physical resources to accommodate the execution of the virtual machine therein.

12. The method of claim 9, wherein:
    during the migration process, an execution rate of instructions of the virtual machine in the first host computer is reduced.

13. The method of claim 9, wherein:
    during the migration process, IO operations issued by the virtual machine are directed to an IO cache for execution in the second host computer using the new IO path.

14. The method of claim 13, wherein the IO cache is maintained in memory of the first host computer and transferred to the second host computer during the migration process.

15. The method of claim 9, wherein said terminating is carried out before an entire state of the virtual machine is transferred from the first host computer to the second host computer.

16. The method of claim 15, further comprising:
    in response to a request from the second computer, transferring a portion of the entire state of the virtual machine to the second computer.

17. A virtualized computing system comprising:
    a plurality of host computers, including a first host computer having one or more virtual machines being executed therein, and a second host computer;
    a shared storage system that stores virtual disks of the virtual machines; and
    a virtual machine management server that is programmed to: (i) notice a failure in an IO path from a virtual machine being executed in the first host computer to the shared storage system, (ii) initiate a migration process of the virtual machine from the first host computer to a second host computer that is connected to the shared storage system along a different IO path that is functioning, and (iii) terminate the migration process and transfer execution control of the virtual machine from the first host computer to the second host computer, as a result of which the different IO path is established as a new IO path from the virtual machine to the shared storage system.

18. The system of claim 17, wherein the first host computer detects the failure in the IO path from the virtual machine to the shared storage system and notifies the virtual machine management server of the failure.

19. The system of claim 17, wherein the virtual machine management server is programmed with a dynamic resource scheduling module for balancing resource usage across the plurality of host computers, and the second host computer is selected based on an output of the dynamic resource scheduling module.

20. The system of claim 19, wherein the virtual machine management server is programmed to track IO paths between the plurality of host computers and the shared storage system and the second computer has at least one IO path to the shared storage system that is functioning.

* * * * *